(12) United States Patent
Wenger et al.

(10) Patent No.: US 10,904,558 B2
(45) Date of Patent: Jan. 26, 2021

(54) METHOD AND APPARATUS FOR MOTION COMPENSATION FOR 360 VIDEO CODING

(71) Applicant: TENCENT AMERICA LLC, Palo Alto, CA (US)

(72) Inventors: Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/396,114

(22) Filed: Apr. 26, 2019

(65) Prior Publication Data

US 2020/0344489 A1 Oct. 29, 2020

(51) Int. Cl.

| | |
|---|---|
| *H04N 19/513* | (2014.01) |
| *H04N 19/85* | (2014.01) |
| *H04N 19/105* | (2014.01) |
| *H04N 19/172* | (2014.01) |
| *H04N 19/573* | (2014.01) |

(52) U.S. Cl.
CPC ......... *H04N 19/513* (2014.11); *H04N 19/105* (2014.11); *H04N 19/172* (2014.11); *H04N 19/573* (2014.11); *H04N 19/85* (2014.11)

(58) Field of Classification Search
CPC .. H04N 19/105; H04N 19/513; H04N 19/172; H04N 19/573; H04N 19/85
See application file for complete search history.

(56) References Cited

U.S. PATENT DOCUMENTS

| | | | |
|---|---|---|---|
| 6,337,708 B1* | 1/2002 | Furlan | H04N 5/2259 348/36 |
| 2006/0212413 A1* | 9/2006 | Rujan | G06K 9/6269 706/20 |
| 2013/0070854 A1* | 3/2013 | Wang | H04N 19/105 375/240.16 |

(Continued)

OTHER PUBLICATIONS

Bharath Vishwanath et al. "Rotational Motion Model for Temporal Prediction in 360 Video Coding." Department of Electrical and Computer Engineering, University of California Santa Barbara, pp. 1-6.

(Continued)

*Primary Examiner* — Anner N Holder
(74) *Attorney, Agent, or Firm* — Sughrue Mion, PLLC

(57) ABSTRACT

A method of decoding a coded video sequence in a decoder, into a series of reconstructed pictures, is provided, the reconstructed pictures representing a projection on a planar surface of a non-planar surface. The method includes generating an ordered candidate list including a plurality of candidate motion vectors for a current prediction unit (PU) under reconstruction, by ordering the plurality of candidate motion vectors in the ordered candidate list based on a geometric property of the projection including the current PU and based on a position of the current PU in the projection, decoding an index, referencing the generated ordered candidate list using the decoded index to select one of the plurality of candidate motion vectors from the generated ordered candidate list, generating a prediction signal, using the selected one of the plurality of candidate motion vectors, and reconstructing the current PU, using the generated prediction signal.

14 Claims, 15 Drawing Sheets

(56) References Cited

U.S. PATENT DOCUMENTS

| | | | | |
|---|---|---|---|---|
| 2013/0272410 A1* | 10/2013 | Seregin | ................. | H04N 19/52 375/240.16 |
| 2015/0030073 A1* | 1/2015 | Chen | ................... | H04N 19/597 375/240.16 |
| 2016/0050430 A1* | 2/2016 | Xiu | ...................... | H04N 19/513 375/240.16 |
| 2016/0112704 A1* | 4/2016 | Grange | ............... | H04N 19/597 375/240.12 |
| 2016/0165263 A1* | 6/2016 | Zhang | ................. | H04N 19/597 375/240.12 |
| 2018/0070100 A1* | 3/2018 | Chen | ................... | H04N 19/597 |
| 2019/0215532 A1* | 7/2019 | He | ..................... | H04N 19/563 |

OTHER PUBLICATIONS

International Search Report and Written Opinion dated May 22, 2020, issued by the International Searching Authority in application No. PCT/US2020/029440.

\* cited by examiner

METHOD AND APPARATUS FOR MOTION COMPENSATION FOR 360 VIDEO CODING

BACKGROUND

1. Field

Methods and apparatuses consistent with embodiments relate to image and video coding and decoding, and more specifically, a method and an apparatus for motion compensation for 360 video coding.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques in which an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Video coding according to the above technologies, historically, has often assumed input content captured from a single camera. Other content that has attracted attention is known as stereoscopic content: two camera signals from cameras spatially aligned such that the axis of capture is approximately parallel, when combined in a suitable renderer, can provide the illusion of a three-dimensional picture when viewed under certain conditions. As the camera signals are highly correlated, certain video coding technologies have been devised that correlate the two signals to obtain a coding efficiency higher than what the coding efficiency could be when both signals were coded individually. One of such technologies is known as multiview coding, as available in the form of profiles in both H.264 and H.265. In some cases, such multiview coding can be extended to the combined coding of more than two camera signals, while still leveraging the similarity, if any, of the multiple camera signals. However, multiview coding in the aforementioned sense still operates on planar camera images.

Recently, input devices have become available that include potentially many cameras at capture angles that are not parallel. To the extent possible based on the physical layout, those input devices allow to capture a spherical volume of space. Such cameras may be marketed, and are referred to herein, as "360 cameras," as they may capture a 360 degree field of view in all dimensions. Still image 360 cameras may operate by using a pan-tilt camera head that mounts a single camera with a lens that may capture a comparatively wide angle. By rotating both axis of the pan-tilt head to certain positions before taking a shot, a sequence of still images can be captured by the camera in such a way that the individual still images overlap to some extent. Using geometric information consistent with the control information used to control the pan tilt camera head, these images can be geometrically corrected and stitched together to form a planar image that can be input into traditional image processing technologies, for example for the purpose of compression and transmission. The geo-correction and stitching process is referred to herein as "projection." Rendering a 360 image can involve the selection of a viewpoint or viewing direction pertaining to the 360 captured scene, reverse geometric correction, de-stitching, etc., to create a planar image suitable for viewing. The reverse geometric correction and de-stitching is referred to herein as "de-projection" or "inverse projection." Ideally, the scene depicted in that image would be the same as if a planar image would have been captured in the viewing direction or from the selected viewpoint.

Above concept can be extended to the capture of video, as video can be represented by a series of still images captured and rendered in sufficiently short time intervals. 360 video capable cameras are commercially available in two basic variants. A first variant uses a rapidly rotating camera head with one or more cameras and appropriate lenses arranged such that, over the course of one rotation, a 360 degree scene (in one dimension) can be shot. The one or more cameras and lenses may be arranged such that the other dimension is covered. To obtain a frame rate of, for example 60 frames per second, the camera head has to rotate at, for example, a minimum of 3600 revolutions per minute. To avoid camera blur, the capture time of the cameras may have to be selected very short, which may limit the number photons the camera sensors are exposed to, leading to noisy images, need of high illumination of the scene, or both. Other implementations can omit the mechanically critical rotating head through the use of many cameras and appropriate lenses that are arranged such that the overlapping view of all cameras and lenses captures the whole 360 degree sphere, avoiding the aforementioned problems at the additional cost of requiring many more cameras and lenses. Mixing forms of the two concepts are also possible. Due to the decreasing cost of electro-optical components relative to mechanical components, there appears to be a trend away from mechanical 360 cameras towards multi-lens cameras. Further, some designs omit the capture in certain, often relatively narrow, capture angles based on the understanding that the 360 camera, being a physical device, may need to be mounted somewhere, and that the mounting hardware is likely of limited interest to the viewers. Like in the still camera above, many 360 capable cameras geometrically project the images (captured in the same instant in time, or nearly so in case of a rotating head) together so to form a series of projected images representing a 360 degree view of the camera.

The projection of an image representing a spherical capture scene onto a planar surface has been a known and well-studied problem for centuries. One well-known projection is, for example, the Mercator projection, introduced in 1569, which is a cylindrical projection and still in use in many maps of the world. Since then, many other projections have been devised, including, for example, equirectangular projection, conic projection, Aitoff projection, Hammer projection, Plate Carree projection, and so forth. Referring to FIG. 1, shown are a few (of many) projections that may be suitable for the mapping of spherical capture scene onto a planar surface, and have been studied in the context of 360 degree video compression. Shown is a globe (101), with three projections to a planar map of the globe. The first projection is known as equirectangular projection (102). The second projection is a cubical projection, wherein the surface of the globe is projected on six square, flat, square surfaces that represents the six directions at 90 degree displacement in each dimension. The six squares can be arranged on a single planar surface, resulting in a cube map (103). The arrangement of the surfaces of the cube in the planar surface presented here is one of several options. Finally, an icosahedronal projection projects the globe's surface on the surface of an icosahedron (104) (a three-dimensional symmetric geometric figure composed of 20 triangular flat surfaces), and those 20 triangular surfaces can be arranged on a single planar surface (105). Again, many sensible options exist for the spatial allocation of the 20 triangular surfaces on the single planar surface (105).

These, and other suitable projection formats attempt to map a spherical surface to a planar surface. The planar representation necessarily cannot be a mathematically correct representation of the geometric features of the sphere, but rather an approximation that has a certain amount of error. Where, spatially, that error is located and how big it can become depends on the nature of the projection. For example, it is well known that the equidistant projection significantly overstates longitudinal distances at latitudes far away from the equator. For example, in an equidistant projected map of the world, the island of Greenland is depicted larger than the continent of Australia, although in reality it has only about ⅓ of the surface area.

Motion compensation can relate to the use of one or more spatially displaced blocks of samples as predictors during the reconstruction of a block. For planar surfaces, many techniques for motion search and compensation are known in the art. Motion models for sample values taking into account non-planar surfaces have recently also been studied. See, e.g., B. Vishwanath, T. Nanjundaswamy, and K. Rose, "Rotational Motion Model for Temporal Prediction in 360 Video Coding," MMSP 2017, ISSN 2473-3628. These motion models do not take advantage of certain techniques such as motion vector prediction.

SUMMARY

According to embodiments, there is provided a method of decoding a coded video sequence in a decoder, into a series of reconstructed pictures, the reconstructed pictures representing a projection on a planar surface of a non-planar surface, and the decoder employing motion compensation with motion vector prediction. The method includes generating an ordered candidate list including a plurality of candidate motion vectors for a current prediction unit (PU) under reconstruction, by ordering the plurality of candidate motion vectors in the ordered candidate list based on a geometric property of the projection including the current PU and based on a position of the current PU in the projection. The method further includes decoding an index, referencing the generated ordered candidate list using the decoded index to select one of the plurality of candidate motion vectors from the generated ordered candidate list, generating a prediction signal, using the selected one of the plurality of candidate motion vectors, and reconstructing the current PU, using the generated prediction signal.

According to embodiments, there is provided an apparatus for decoding a coded video sequence, into a series of reconstructed pictures, the reconstructed pictures representing a projection on a planar surface of a non-planar surface, and the apparatus employing motion compensation with motion vector prediction. The apparatus includes at least one memory configured to store computer program code, and at least one processor configured to access the at least one memory and operate according to the computer program code. The computer program code includes first generating code configured to cause the at least one processor to generating an ordered candidate list including a plurality of candidate motion vectors for a current prediction unit (PU) under reconstruction, by ordering the plurality of candidate motion vectors in the ordered candidate list based on a geometric property of the projection including the current PU and based on a position of the current PU in the projection. The computer program code further includes decoding code configured to cause the at least one processor to decode an index, and selecting code configured to cause the at least one processor to reference the generated ordered candidate list using the decoded index to select one of the plurality of candidate motion vectors from the generated ordered candidate list. The computer program code further includes second generating code configured to cause the at least one processor to generate a prediction signal, using the selected one of the plurality of candidate motion vectors, and reconstructing code configured to cause the at least one processor to reconstruct the current PU, using the generated prediction signal.

According to embodiments, there is provided a non-transitory computer-readable storage medium storing instructions that cause at least one processor to decode a coded video sequence, into a series of reconstructed pictures, the reconstructed pictures representing a projection on a planar surface of a non-planar surface, and the at least one processor employing motion compensation with motion vector prediction. The instructions further cause the at least one processor to generate an ordered candidate list including a plurality of candidate motion vectors for a current prediction unit (PU) under reconstruction, by ordering the plurality of candidate motion vectors in the ordered candidate list based on a geometric property of the projection including the current PU and based on a position of the current PU in the projection. The instructions further cause the at least one processor to decode an index, reference the generated ordered candidate list using the decoded index to select one of the plurality of candidate motion vectors from the generated ordered candidate list, generate a prediction signal, using the selected one of the plurality of candidate motion vectors, and reconstruct the current PU, using the generated prediction signal.

DETAILED DESCRIPTION

Figure 1:
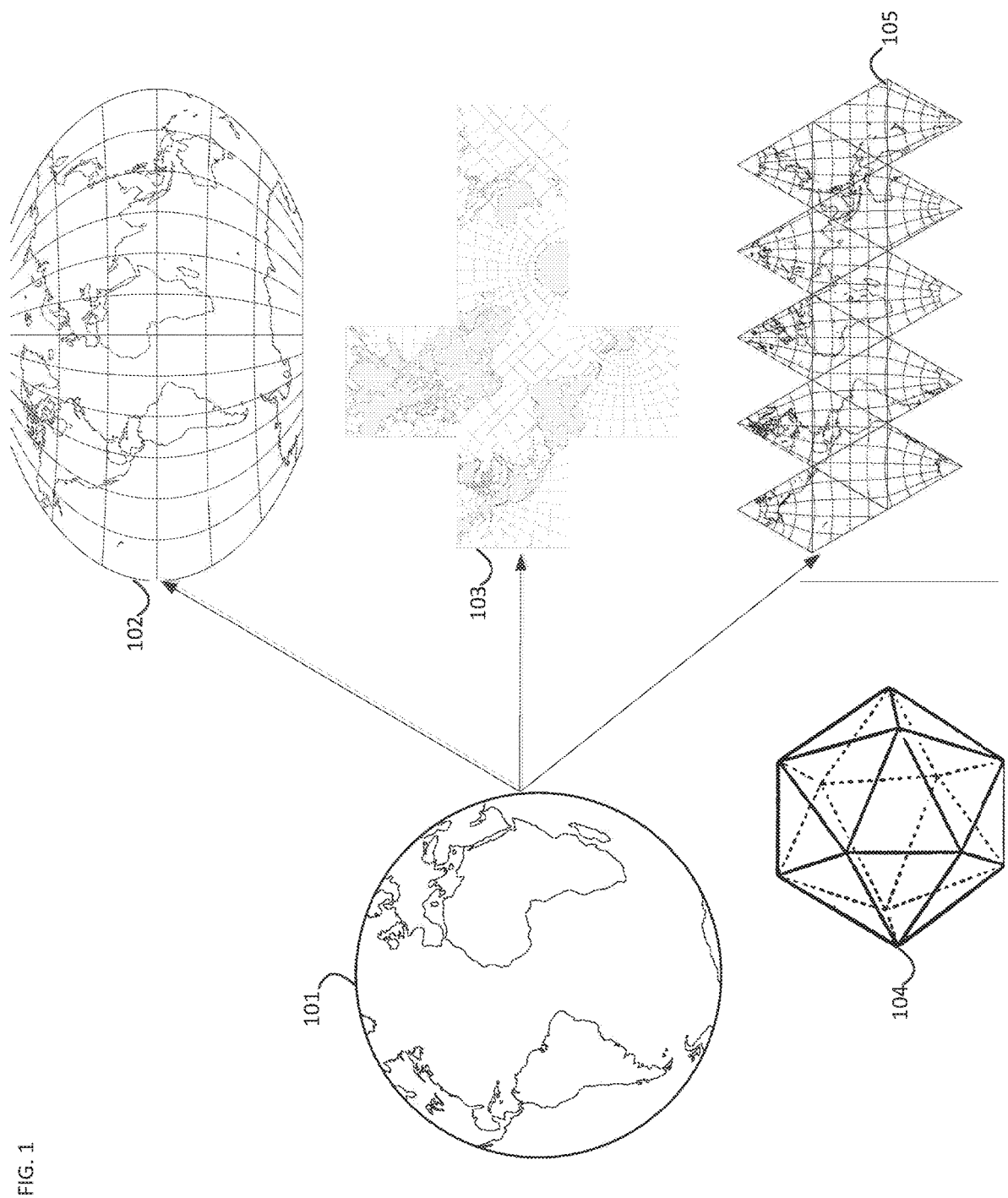
FIG. 1 is a schematic illustration of several projections in accordance with prior art.

A 360 video compression system may operate by first using a projection, for example equirectangular projection, cube projection, and so forth, to map a 360 video sequence into a planar picture sequence, and that planar sequence thereof, may be subject to compression. Compression techniques for planar images and video are well known, but are optimized for input material of which the relevance of each sample is approximately similar, and in which there is no known geometric distortion present, or, at least without taking geometric distortion into account. Geometrical inaccuracies and errors introduced through the projection step, however, render the planar image such that certain areas and samples of the planar representation are less relevant than others, in that they represent a comparably smaller surface area on the sphere from which they were projected from. Further, in certain projections, the geometric relationship of the samples in the projection may be different than the geometric relationship of the corresponding samples on the sphere. For example, samples that form an approximately straight line (more specifically, a great-cycle segment) on the sphere's surface could be represented by samples forming a curve in the planar picture, after projection.

Motion vectors (as at least some other two-dimensional vectors) can be identified by a displacement, in sub-sample accuracy, in x and y dimension. The displacement, in x and y dimension, can in some video compression technologies or standards be a substantial part of the picture size, up to the width and height of the picture for the x and y dimension, respectively. As such, coding a motion vector can take a large number of bits. Motion vectors may also be coded for relatively small prediction units (PUs), sometimes as small as 4×4 samples. Accordingly, depending on the nature of the scene, many motion vectors may be required to code a given sequence of pictures. To improve coding efficiency, at least some video compression technologies or standards can use various forms of motion vector prediction to reduce the number of bits required to code a given motion vector. Motion vector prediction can be in the form of temporal prediction in which the motion vector is at least in parts predicted from one or more motion vectors covering the same spatial volume in previously decoded pictures, in the form of spatial prediction, in which motion vectors of surrounding areas serve as predictors and mixing/combining forms of the two. However, in all mentioned cases, in the deployed video coding technologies or standards the motion vectors are straight vectors on the planar surface, which (after inverse projection) would in many cases be represented by curve on the surface of the sphere. However, motion is, naturally a linear phenomenon due to the laws of inertia. Insofar, for optimal results, motion vector prediction needs to take linear motion on the sphere's surface into account, which may translate into curved motion on the planar projection.

The disclosed subject matter relates to the efficient use of motion compensation based inter picture prediction in environments in which the input to a planar video codec has been artificially created from non-planar content such as 360 video. Specifically, in some environments, the motion compensation can take the non-linear nature of certain projections into account.

Figure 2:
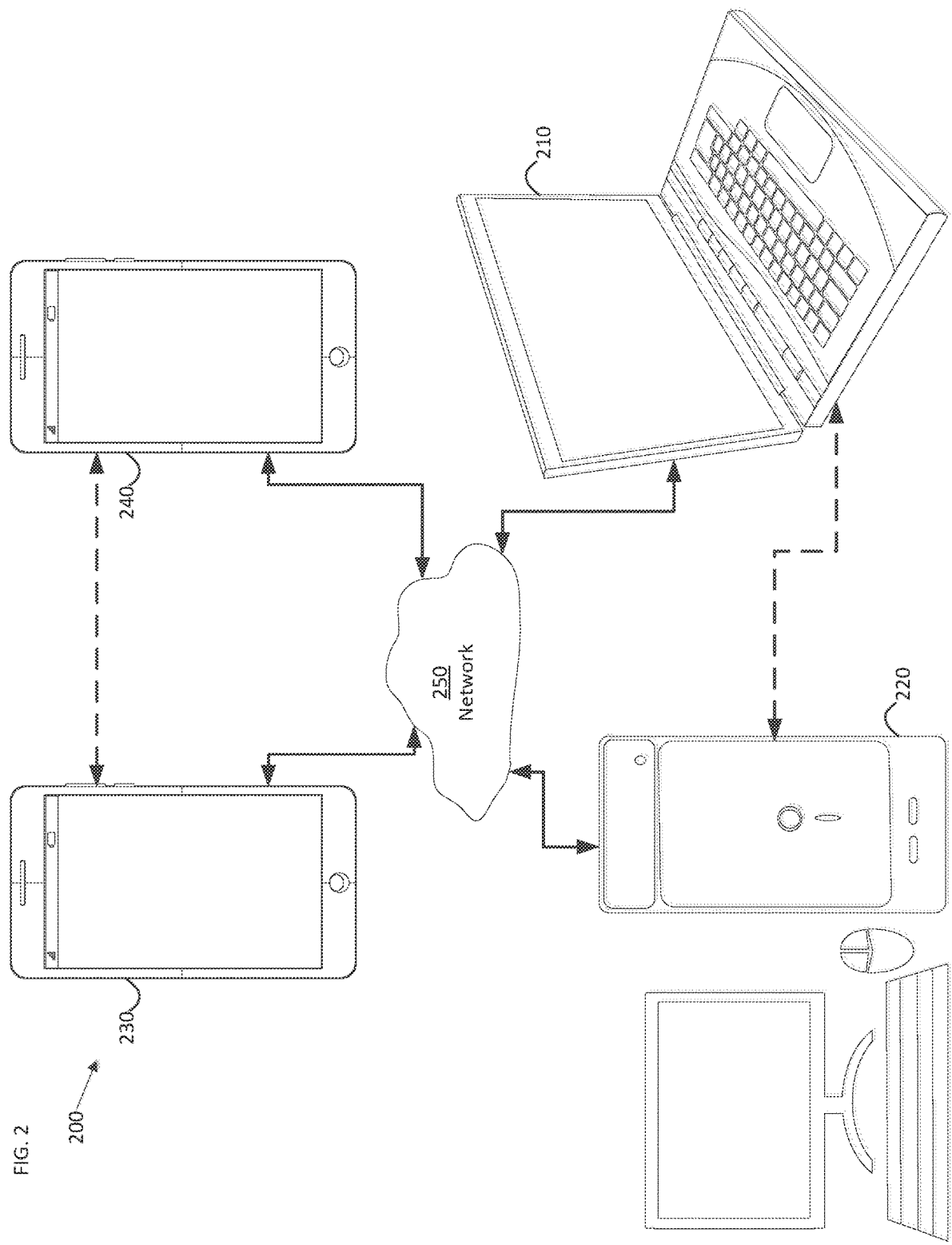
FIG. 2 is a schematic illustration of a simplified block diagram of a communication system in accordance with an embodiment.

FIG. 2 is a schematic illustration of a simplified block diagram of a communication system (200) in accordance with an embodiment. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the disclosure may be not so limited. Embodiments of the disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the disclosure unless explained herein below.

Figure 3:
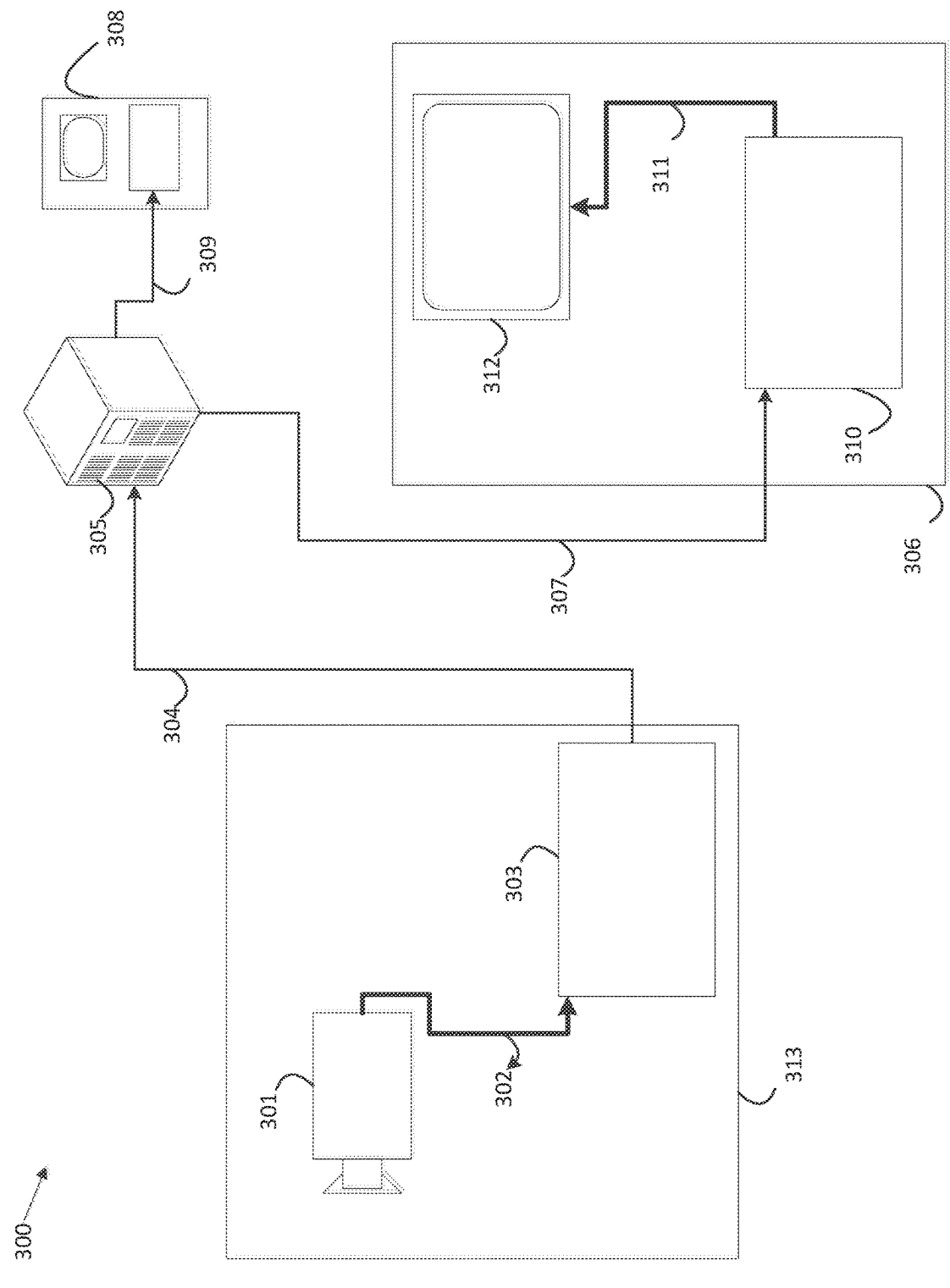
FIG. 3 is a schematic illustration of a simplified block diagram of a placement of a video encoder and a video decoder in a streaming system, in accordance with an embodiment.

FIG. 3 is a schematic illustration of a simplified block diagram of a placement of a video encoder (303) and a video decoder (310) in a streaming system (300), in accordance with an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) that decodes the incoming copy of the encoded video bitstream (307) and creates an outgoing video sample stream (311) that can be rendered on a display (312) or other rendering device. In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

The communication system (200) or streaming system of FIG. 3 can be extended to enable the use of 360 video.

Figure 4:
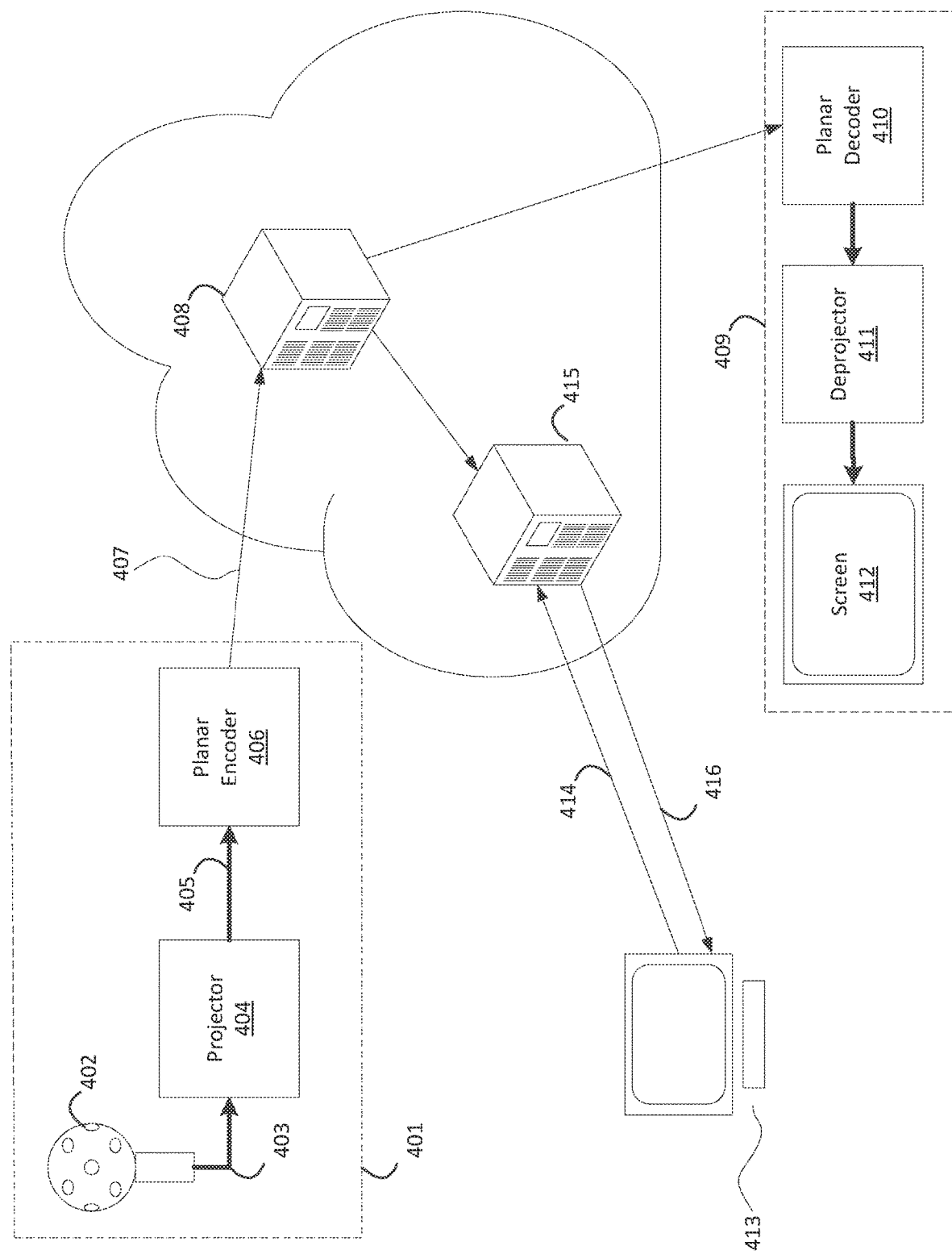
FIG. 4 is a schematic illustration of a simplified block diagram of a 360 communication/streaming system in accordance with an embodiment.

FIG. 4 is a schematic illustration of a simplified block diagram of a 360 communication/streaming system in accordance with an embodiment. Referring to FIG. 4, a layout of such a 360 system can be as follows. The 360 video capture unit (401) can include a 360 capable video camera (402) and a projector (404) that projects the incoming 360 images (403) into planar images (405). The 360 images (403) and the planar images (405) are depicted as boldface arrow so to emphasize the high data rate when compared to compressed signals, such as the coded video sequences (407). The planar images can be converted by a planar encoder (406) into one or more coded video sequences (407) that can also include side metainformation related, for example, to the projection that was generated by or obtained from the projector (404). The coded video sequences (407) can be forwarded directly to a decoder/renderer over a network, or can be stored on a streaming server (408). The streaming server (408) can stream the coded video sequences directly to a 360 video capable endpoint (409), which can include a (planar) decoder (410) and a deprojector (411). The deprojector (411) can, for example inverse the projection introduced by projector (404) such that one or more image sequences are formed that are suitable for display, for example, by a device such as virtual reality goggles, pseudo-3D capable screens (412), and the like. The deprojector may be controlled by a user interface that allows the user to select a viewing angle, viewpoint, and the like. This data flow can require the full 360 video presentation, as projected and compressed by projector (404) and encoder (406), to be streamed to the 360 capable endpoint (409).

As an alternative or in addition, in some cases a receiving endpoint may not have the connectivity or the computational resources to perform the decoding of all data required to reconstruct the full 360 degree scene, or the inverse projection. In such cases, a traditional (non-360 capable) endpoint (413) can send meta-information (414), obtained for example from its user interface, related to the viewpoint, to a 360 processor (415) located in the network. The 360 processor can perform the tasks of the 360 capable endpoint based on the meta information obtained, and then re-encode in a traditional (planar-optimized) encoder the rendered planar video (416) for consumption by the traditional endpoint (413). In such a scenario, the computationally heavy decoding of the 360 scene and the inverse projection can be offloaded into cloud-based resources like the 360 processor (415). As described, the 360 processor can act as a transcoder in that it has both decompression and compression mechanisms.

In embodiments, all or some of processing methods described herein may be performed in the network, e.g., the 360 processor (415). The 360 processor (415) may receive compressed or raw video or images from 360 video capture unit (401), and further process the received video or images. In these embodiments, the 360 processor (415) may be a local node or controller of a local network such as a surveillance system, or may be a network node such as a server.

In some cases, some of the 360 data, when properly formed and appropriately marked, can be removed by a Selective Forwarding Unit (SFU). If, for example, the projection format is cube projection, then, for any given viewpoint, at least three and up to five of the six planar square representations are not required for rendering (a non-transparent source sphere assumed). A properly configured SFU that is aware of the viewpoint, for example because it has received metadata such as the one the 360 processor (415) is using, can omit forwarding the unnecessary 360 data, assuming that the bitstream is properly formed, for example through the use of slices, tiles, layers, views, and so forth. Such a SFU can be viewed as a lightweight transcoder that does not include some of the signal processing technologies a full transcoder can require.

Figure 5:
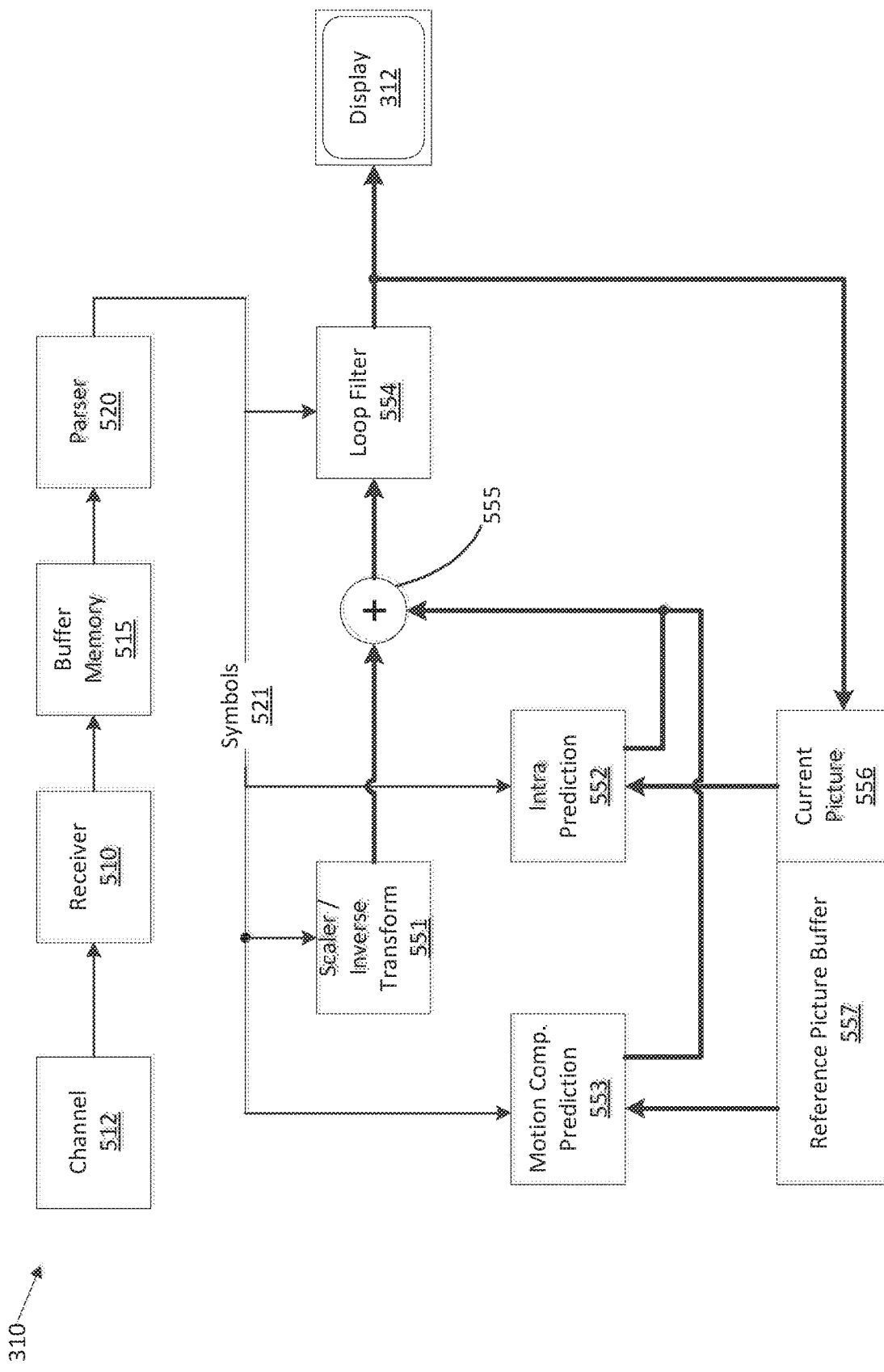
FIG. 5 is a schematic illustration of a simplified block diagram of a video decoder in accordance with an embodiment.

FIG. 5 is a schematic illustration of a simplified block diagram of a video decoder (310) in accordance with an embodiment.

A receiver (510) may receive one or more codec video sequences to be decoded by the decoder (310); in the same or another embodiment, one coded video sequence at a time, and the decoding of each coded video sequence is independent from other coded video sequences. The coded video sequence may be received from a channel (512), which may be a hardware/software link to a storage device that stores the encoded video data. The receiver (510) may receive the encoded video data with other data, for example, coded audio data and/or ancillary data streams that may be forwarded to their respective using entities. The receiver (510) may separate the coded video sequence from the other data. To combat network jitter, a buffer memory (515) may be coupled in between receiver (510) and entropy decoder/parser (520) ("parser" henceforth). When receiver (510) is receiving data from a store/forward device of sufficient bandwidth and controllability, or from an isosychronous network, the buffer (515) may not be needed, or can be small. For use on best effort packet networks such as the Internet, the buffer (515) may be required, can be comparatively large and can advantageously of adaptive size.

The video decoder (310) may include a parser (520) to reconstruct symbols (521) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments. The parser (520) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (520) may extract from the coded video sequence, a set of subgroup parameters for any one or any combination of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units and so forth. The entropy decoder/parser may also extract from the coded video sequence information such as transform coefficients, quantizer parameter values, motion vectors, and so forth.

The parser (520) may perform entropy decoding/parsing operation on the video sequence received from the buffer (515), so to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives quantized transform coefficient as well as control information, including that transform to use, block size, quantization factor, quantization scaling matrices, etc. as symbol(s) (521) from the parser (520). It can output blocks including sample values that can be input into aggregator (555).

In some cases, the output samples of the scaler/inverse transform (551) can pertain to an intra coded block; that is: a block that is not using predictive information from previously reconstructed pictures but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current (partly reconstructed) picture (556). The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (in this case called the residual samples or residual signal) so to generate output sample information. The addresses within the reference picture memory form where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (555) can be subject to various loop filtering techniques in the loop filter unit (554). Video compression technologies can include in-loop filter technologies that are controlled by parameters included in the coded video bitstream and made available to the loop filter unit (554) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (554) can be a sample stream that can be output to the render device (312) as well as stored in the reference picture memory (557) for use in future inter-picture prediction.

Certain coded pictures, once fully reconstructed, can be used as reference pictures for future prediction. Once a coded picture is fully reconstructed and the coded picture has been identified as a reference picture (by, for example, parser (520)), the current reference picture (556) can become part of the reference picture buffer (557), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also may be necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (510) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or SNR enhancement layers, redundant slices, redundant pictures, forward error correction codes, and so on.

Figure 6:
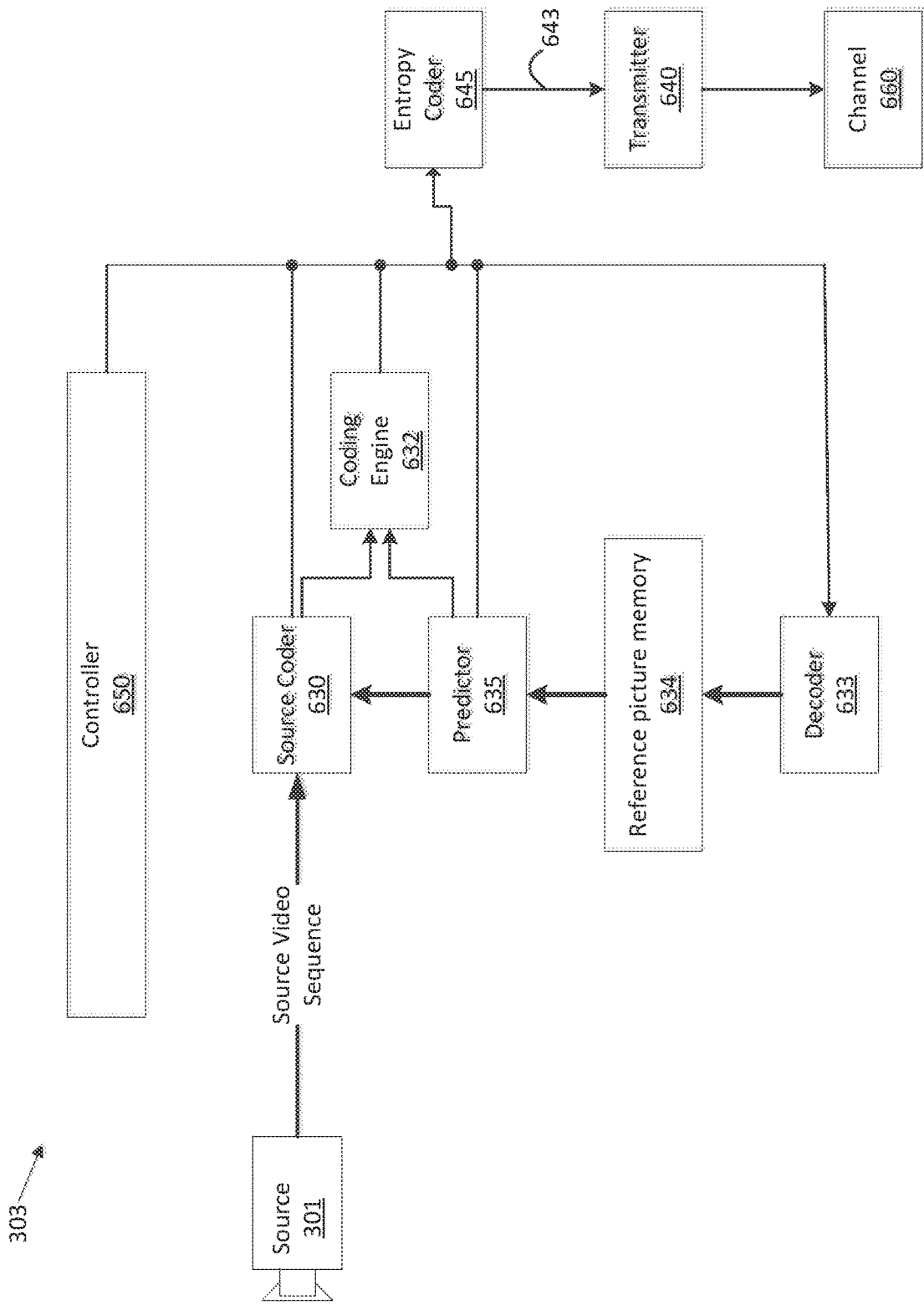
FIG. 6 is a schematic illustration of a simplified block diagram of a video encoder in accordance with an embodiment.

FIG. 6 is a schematic illustration of a simplified block diagram of a video encoder (303) in accordance with an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CiCb 4:2:0, Y CiCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (643) in real time or under any other time constraints as required by the application. Enforcing appropriate coding speed is one function of controller (650). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (650) as they may pertain to video encoder (303) optimized for a certain system design.

Some video encoders operate in what a person skilled in the are readily recognizes as a "coding loop." As an oversimplified description, a coding loop can consist of the encoding part of an encoder (630) ("source coder" henceforth) (responsible for creating symbols based on an input picture to be coded, and a reference picture(s)), and a (local) decoder (633) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (634). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (633) can be the same as of a "remote" decoder (310), which has already been described in detail above in conjunction with FIG. 5. Briefly referring also to FIG. 5, however, as symbols are available and en/decoding of symbols to a coded video sequence by entropy coder (645) and parser (520) can be lossless, the entropy decoding parts of decoder (310), including channel (512), receiver (510), buffer (515), and parser (520) may not be fully implemented in local decoder (633).

An observation that can be made at this point is that any decoder technology except the parsing/entropy decoding that is present in a decoder also may need to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description may be required and provided below.

As part of its operation, the source coder (630) may perform motion compensated predictive coding, which codes an input frame predictively with reference to one or more previously-coded frames from the video sequence that were designated as "reference frames." In this manner, the coding engine (632) codes differences between pixel blocks of an input frame and pixel blocks of reference frame(s) that may be selected as prediction reference(s) to the input frame.

The local video decoder (633) may decode coded video data of frames that may be designated as reference frames, based on symbols created by the source coder (630). Operations of the coding engine (632) may advantageously be lossy processes. When the coded video data may be decoded at a video decoder, the reconstructed video sequence typically may be a replica of the source video sequence with some errors. The local video decoder (633) replicates decoding processes that may be performed by the video decoder on reference frames and may cause reconstructed reference frames to be stored in the reference picture cache (634). In this manner, the encoder (303) may store copies of reconstructed reference frames locally that have common content as the reconstructed reference frames that will be obtained by a far-end video decoder (absent transmission errors).

The predictor (635) may perform prediction searches for the coding engine (632). That is, for a new frame to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the video coder (630), including, for example, setting of parameters and subgroup parameters used for encoding the video data.

Output of all aforementioned functional units may be subjected to entropy coding in the entropy coder (645). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare it for transmission via a communication channel (660), which may be a hardware/software link to a storage device that would store the encoded video data. The transmitter (640) may merge coded video data from the video coder (630) with other data to be transmitted, for example, coded audio data and/or ancillary data streams.

The controller (650) may manage operation of the encoder (303). During coding, the controller (650) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The video coder (630) may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

When coding or decoding samples from a planar video source, all samples can represent approximately the same angular interval of a projection plane perpendicular to the axis of capture and in a sufficient distance, as measured from the camera's viewpoint.

Figure 7:
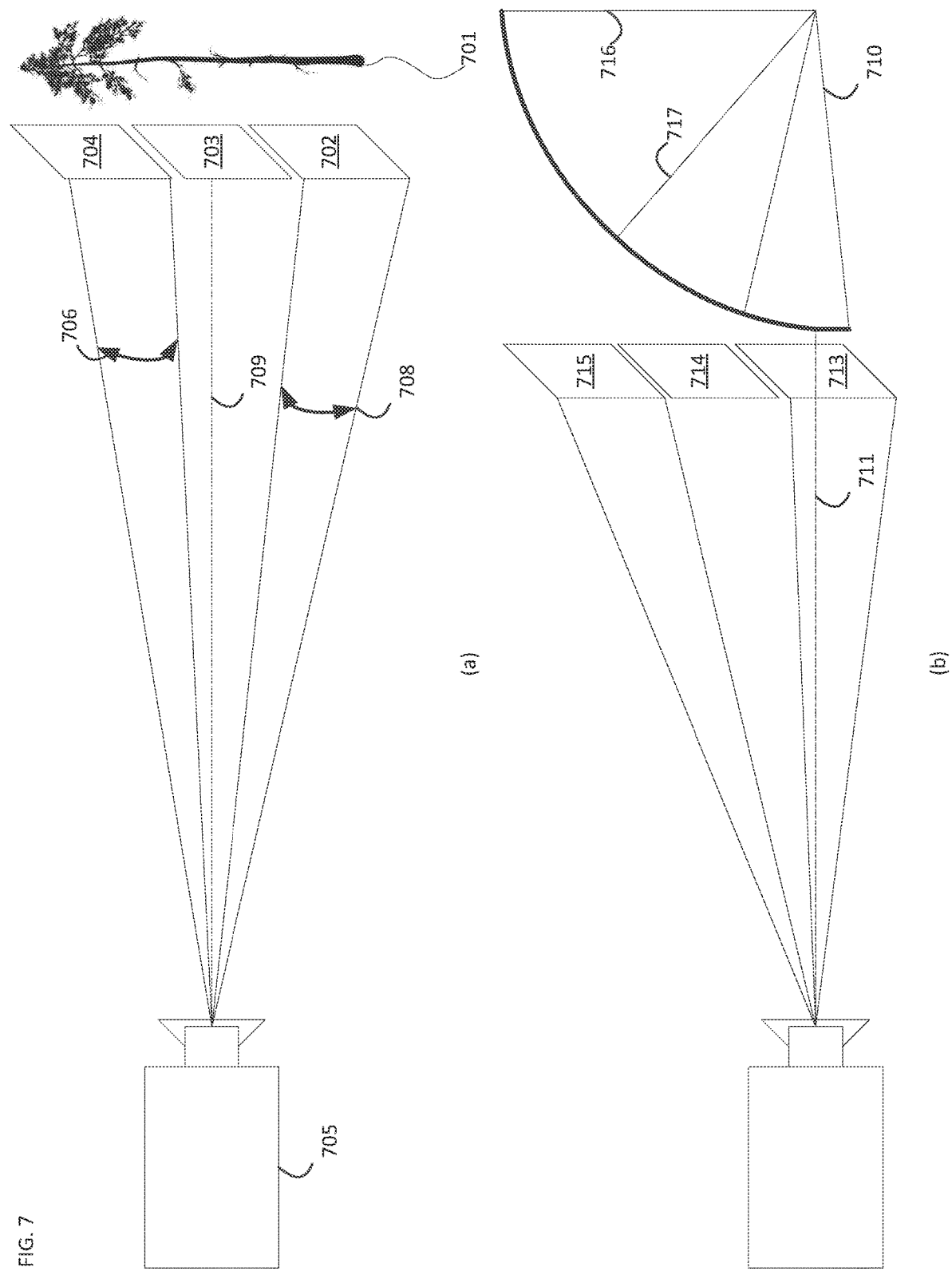
FIG. 7 is a schematic illustration of projections.

FIG. 7 is a schematic illustration of projections. Referring to portion (a) of FIG. 7, as an example, consider the vertical dimension of a projected surface (701), divided in to sample (702, 703, 704), that is captured by camera (705). The sample sizes are drawn out of proportion; in a real system, the vertical resolution of a camera can be 720, 1080, or more samples and not only three. It can be observed that the angular interval (706, 708) representing the samples are approximately the same. Assuming the scene being reasonably flat and approximately perpendicular to the axis of capture (709), the samples (702, 703, 704) are also of approximately the same size. This relationship is known since the advent of photography and lenses for cameras can be designed to create this relationship as close as possible, even under circumstances that may require optical correction, such as a close distance of the camera to the scene being captured in relation to the size of the scene.

Referring to portion (b) of FIG. 7, consider now the capture of a scene that is a sphere (710) (only one quarter of the sphere is depicted) using a simplified representation of an equirectangular projection, with only one dimension depicted. Assume the axis of capture (711) is perpendicular to the equator of the sphere. Shown are three samples (713, 714, 715) with identical angular width. Intuitively, it seems clear that samples close to the equator represent considerably less surface area of the sphere than samples responsible for depicting polar areas. For example, consider sample 715, which represents the northernmost latitudes of the sphere. Its related surface area, shown through dividers (716, 717) is considerably larger than the surface area related to sample 713.

While above example may appear to be extreme, there are projections in common use, that, for practical applications, depict certain polar areas many times larger than warranted by surface area as measured on the sphere. See above for the "Greenland/Australia" example.

Figure 8:
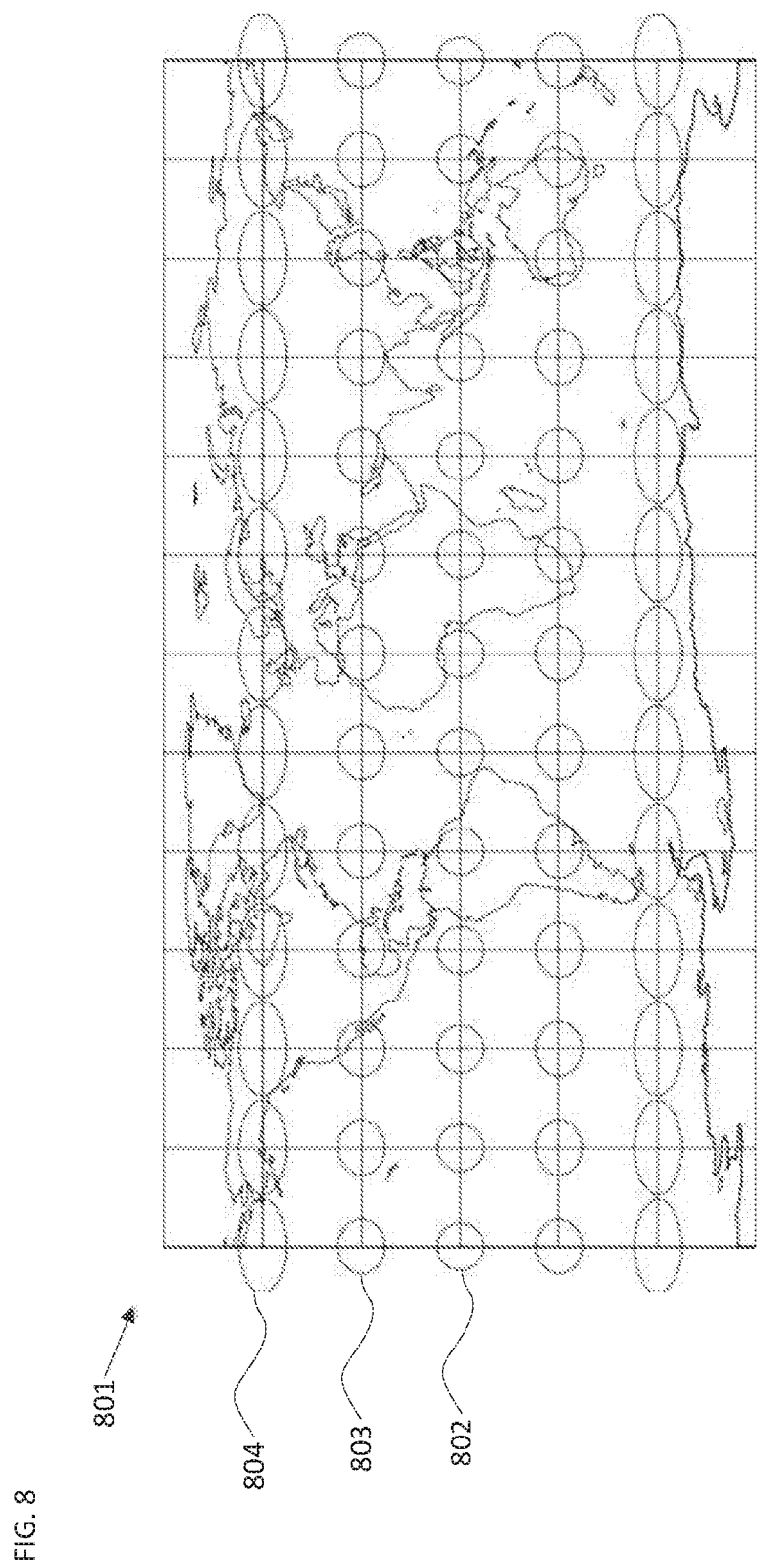
FIG. 8 is a schematic illustration of an equirectangular projection of the surface of earth with a Tissod Indicatrix.

FIG. 8 is a schematic illustration of an equirectangular projection of the surface of earth (801) with a Tissod Indicatrix. Shown is an example of the well-known Tissot's Indicatrix. Each ellipse (802, 803, 804) superimposed on the map represents a circular surface area on the globe. Assume the projection is represented by a sample map with identical sample size. Clearly, in the regions away from the equator, for example the region represented by ellipse (804), a lot more surface area in the projection, and therefore more samples, represents the same area on the globe's surface, then for example ellipse (802) on the equator.

Figure 9:
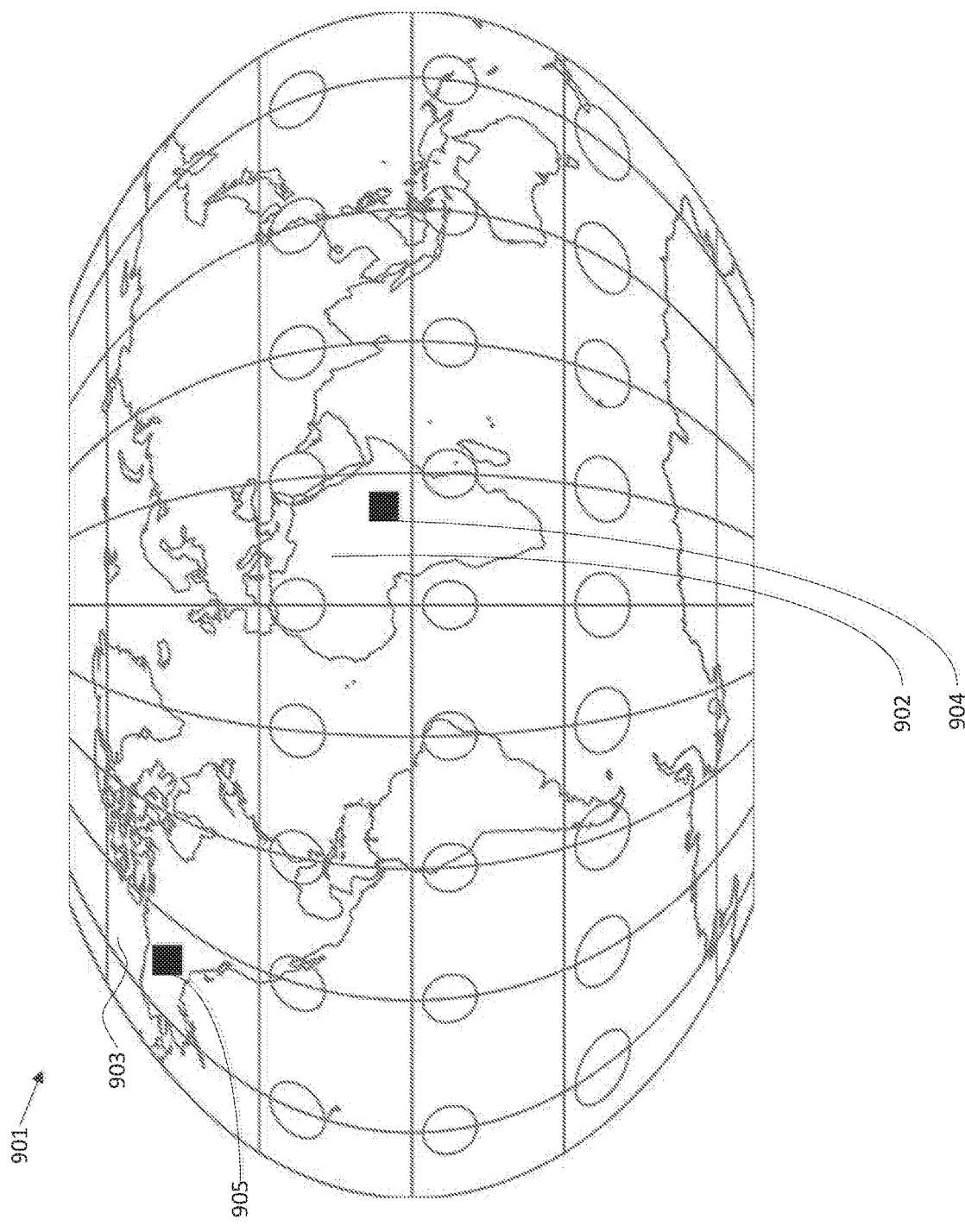
FIG. 9 is a schematic illustration of a Kravrayski-VII projection of the surface of earth.

FIG. 9 is a schematic illustration of a Kavrayskiy-VII projection (901) of the surface of earth, again overlaid with a Tissod Indicatrix. It also includes a few latitude and longitude "lines"; more specifically, lines of constant latitude or longitude, respectively. On the surface of the globe, each of the lines meets other lines at a right angle, and the surface distance between each meet point is assumed to be the same. Yet, in the projection, especially in certain polar regions as well as away from the meridian, the "square"

surface areas are represented by non-square areas. Consider surface area (902), covering northern central Africa. Being close to both equator and the meridian, it is represented approximately (though not exactly) by a square. As an extreme counterexample, consider surface area (903), covering most of Alaska. The shape of this (approximately square, on the globe) surface area is grossly distorted. This is illustrated in FIG. 10.

Figure 10:
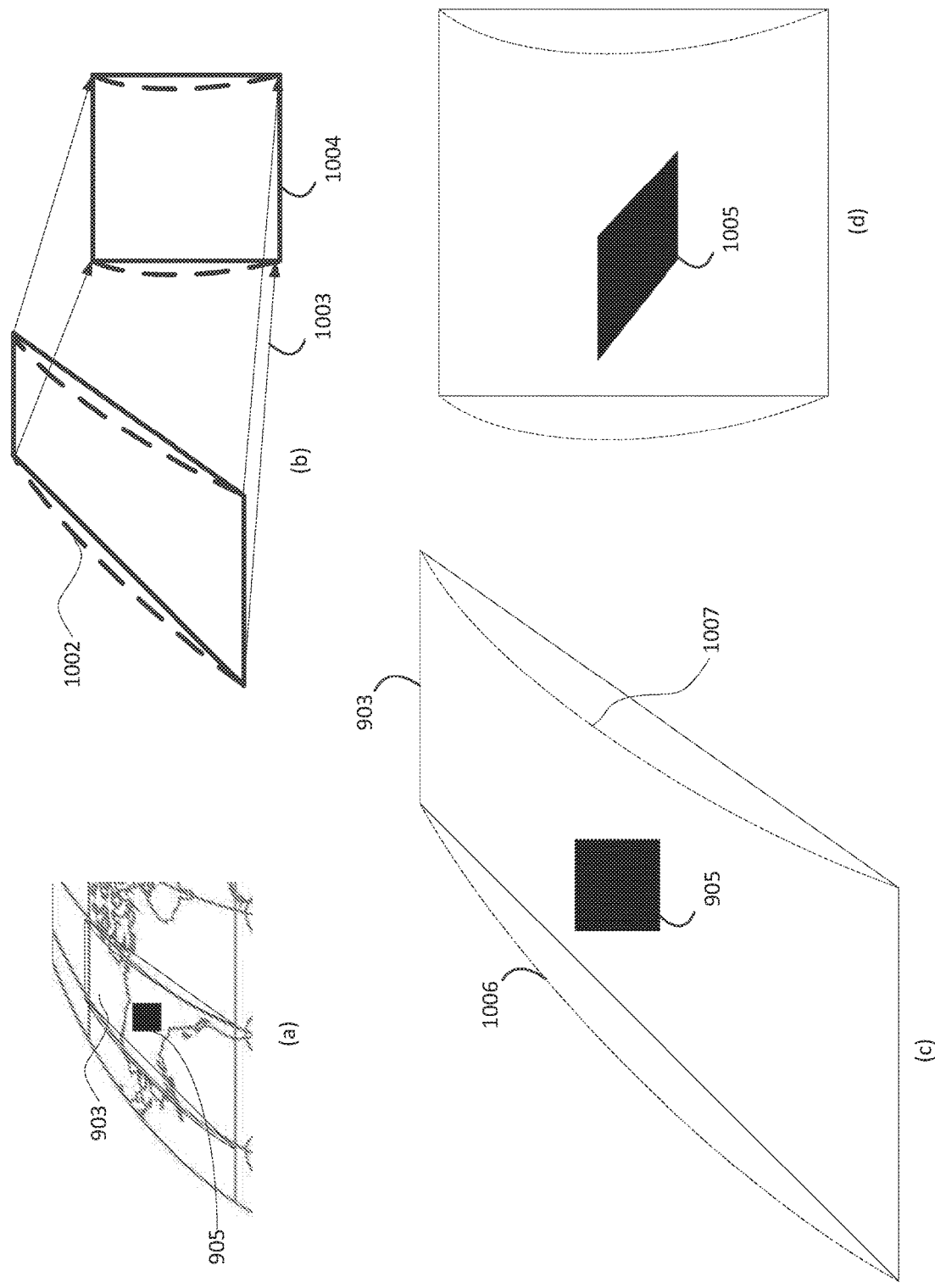
FIG. 10 is a schematic illustration of details of a projection in accordance with an embodiment.

FIG. 10 is a schematic illustration of details of a projection in accordance with an embodiment. Referring to portions (a) and (b) of FIG. 10, shown is an excerpt of the projection of FIG. 9 with only a small part of the northwestern hemisphere (903) depicted; therein a block of samples (905). The shape of the surface area (1002) can be reverse-projected (1003) into a square surface (1004) that is a close approximation of the surface area on the globe. At portions (c) and (d) of FIG. 10, the same surface area (903) and block (905) are projected as shown above. Note the non-square, distorted geometry of the (on the projection square) block (1005). Further note, that the reverse-projection of the block (905) to the distorted block (1005) is a simplification that simplifies the area (903) to a quadrangle. If the curved nature of the edges of the surface area in the projection (1006, 1007) were taken into account, the block (1005) would be even more distorted.

When, due to projection of a spherical scene onto a planar image used for compression, certain samples of that image represent considerably more surface area or angular width of the spherical scene, then those samples become more relevant for the faithful reproduction of the spherical scene after decompression and de-projection. Similarly, for example when using equirectangular projection, samples depicting equatorial regions of the sphere can be covering a comparatively small surface area, which makes them relatively less relevant for faithful reproduction of the spherical scene. Traditional image and video codecs optimized for planar images and videos to not necessarily address this inequality. Further, consider the lines of equal latitude or longitude. On the surface of a sphere, these lines are straight. In the projection, the lines are curved.

One observation that has to be made is that a planar encoder may well have information on the nature and properties of the projection in use. Also, in a practical system design, this information may need to be made known to the de-projector as well, for example though the bitstream. Without such information, a de-projector may not be able to meaningfully operate on the sample stream produced by the planar decoder. As both encoder and decoder systems can easily obtain side information about the projection in use (that may necessarily have to be transmitted from sending to receiving system so to enable the de-projector to inverse-project the scene as created by the projector), the video coding itself does not need to code that information again; the encoder can assume a priori knowledge of it by the decoder. Of course, that side information may also be included in the video bitstream, in which case there may not be a need to send it otherwise.

The disclosed subject matter relates to motion vector prediction. With reference again to FIG. 5, motion compensation can involve a motion compensation prediction unit (553) that can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so to generate output sample information.

The addresses within the reference picture memory (557) form where the motion compensation prediction unit (553) fetches prediction samples can be controlled by motion vectors, available to the motion compensation prediction unit (553) in the form of symbols (521) that can have, for example X, Y, and reference picture components. The interpretation of the symbols (521) can involve motion vector prediction.

Figure 11:
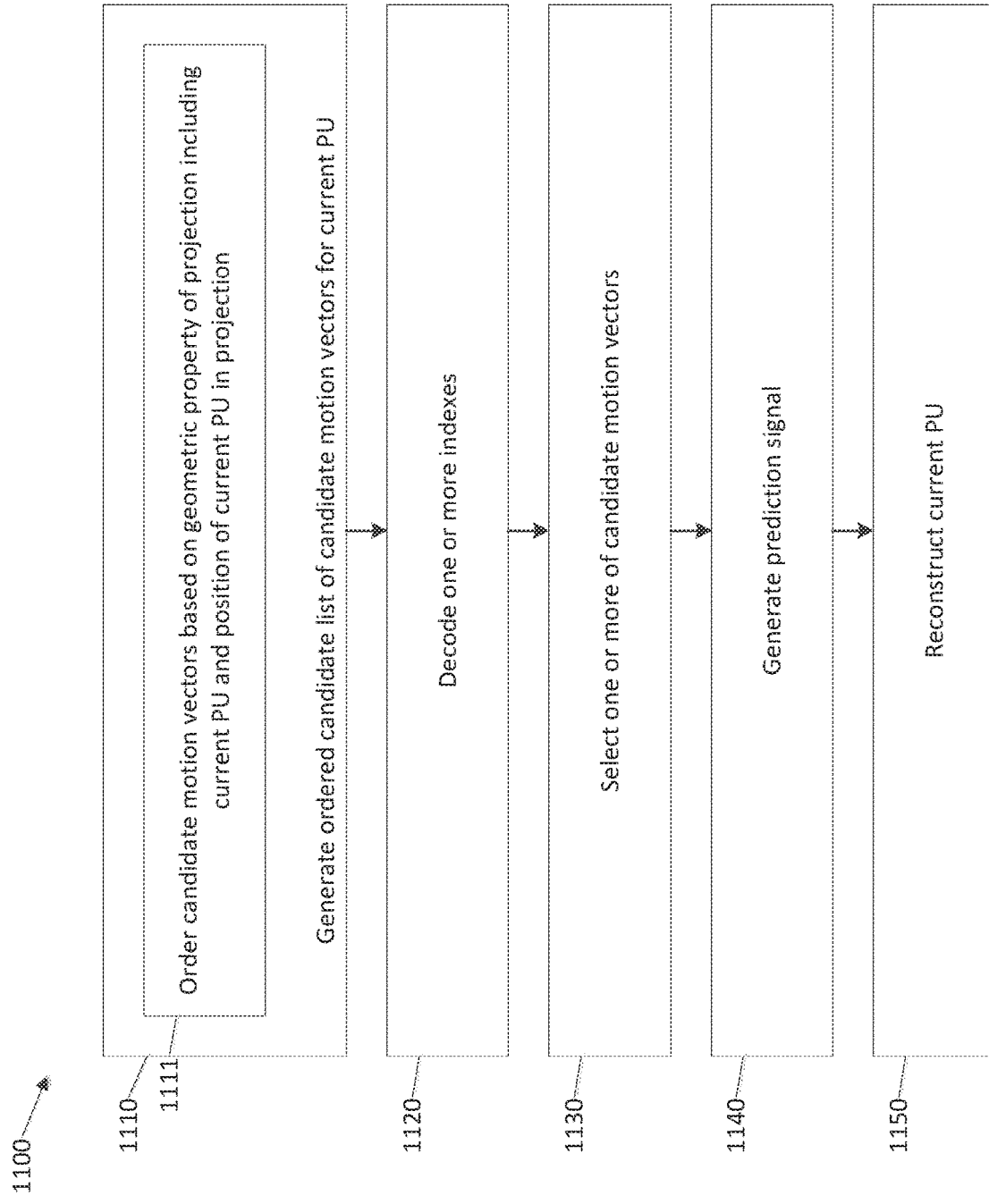
FIG. 11 is a flowchart illustrating a method of motion compensation for 360 video coding, according to an embodiment.

FIG. 11 is a flowchart illustrating a method (1100) of motion compensation for 360 video coding, according to an embodiment. In some implementations, one or more process blocks of FIG. 11 may be performed by the decoder (310). In some implementations, one or more process blocks of FIG. 11 may be performed by another device or a group of devices separate from or including the decoder (310), such as the encoder (303).

FIG. 11 shows an example of motion vector prediction that may be available in planar video compression technologies or standards or, with additional mechanisms or sub-steps (e.g., a sub-step (1111)), in 360 decoders. Shown here is the prediction only of a single motion vector pertaining to a group of samples known as prediction unit or PU. In some cases, more than one motion vector may pertain to a given PU under reconstruction, for example in bi-predicted or multiple-hypothesis pictures. In those cases, more than one predictor signal may be formed, and those predictor signals may be weighted to form a final predictor.

Referring to FIG. 11, in a first block (1110), the method (1100) includes, from a decoder's viewpoint, generating or populating an ordered candidate list of candidate motion vectors for a current PU under reconstruction.

Figure 12:
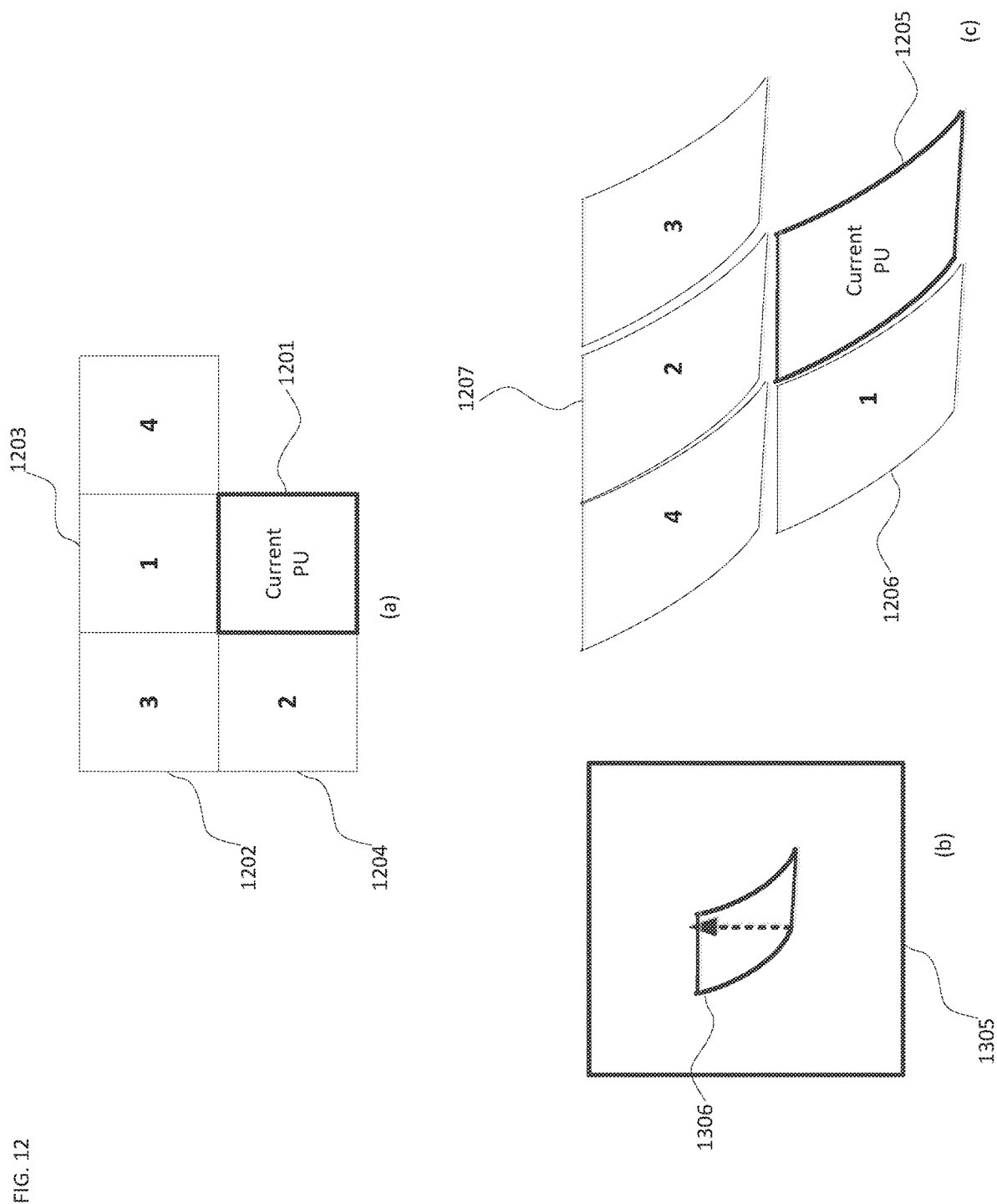
FIG. 12 is a diagram illustrating a process of ordering candidate motion vectors based on a geometric property of a projection including a current PU and based on a position of the current PU in the projection, according to an embodiment.

FIG. 12 is a diagram illustrating a process of ordering candidate motion vectors based on a geometric property of a projection including a current PU and based on a position of the current PU in the projection, according to an embodiment. Briefly referring to FIG. 12 and specifically to an upper area (a) in that figure, for a given PU under reconstruction (1201) those candidate motion vectors can, for example, be a from the motion vector of a PU above and to the left (1202) of the PU under reconstruction (1201), a motion vector from the PU above (1203) the PU under reconstruction (1201), a motion vector from the PU to the left (1204) of the PU under reconstruction (1201), and so forth. The maximum length of the candidate list as well as the location in both space and time (more precisely: reference picture) can differ from one video coding technology or standard to another; what is shown in FIG. 12 is just one of many possible examples. For planar encoders, the ordering of the list can be pre-defined by the video compression technology or standard, and can be such that more likely candidates are located earlier in the ordered list. When planar encoding is in use the ordering of the list can be optimized for planar encoding. However, when 360 coding is in use, in the sub-step (1111), the method (1100) includes ordering the candidate motion vectors of the ordered candidate list based on geometric properties of the projection and a geometric position of the current PU under reconstruction (1201) in the projection. With respect to the disclosed subject matter, this can be significant as, according to an embodiment, the order can be different when coding a planar projection of a non-planar surface. Motivation and example implementation is provided below.

Referring again to FIG. 11, in a second block (1120), the method (1100) includes decoding one or more symbols that, directly or indirectly, refer to one or more indexes into a list of candidate motion vectors. A direct reference may refer to the index(es) being included as an entropy-coded number;

and an indirect reference may include any other form of including the index in derivable form in one or more symbols. In some cases an encoder may have identified during encoding that none of the predictors are suitable to code the motion vector for the PU without a rate-distortion penalty compared to coding the motion vector directly (without prediction), and in that case, such information may derivable from the symbol or symbols.

The sequencing of step (1110, 1111, and 1120) can be in any order. Further, the symbol(s) in use in steps (1110) and (1120) can be the same, rendering the two or three steps, in implementation practice, possibly into a single step.

In a third block (1130), the method (1100) includes referencing the ordered candidate list using the one or more indexes to select one or more of the candidate motion vectors from the ordered candidate list, as motion vector(s) to be used for reconstruction.

In a fourth block (1140), the method (1100) includes, using the selected vector(s), generating a prediction signal.

In a fifth block (1150), the method (1100) includes, using the prediction signal in conjunction with other prediction information, such as, for example, prediction sample values reconstructed from transform coefficients after inverse quantization and transform, reconstructing the current PU.

In an embodiment, the creation of the ordered list of motion vectors in the first block (1110) can include the sub-step (1111) that takes the geometric properties of the projection into account. In certain video coding technologies and standards, the motion vector candidates in case of planar coding are ordered in a certain, pre-defined order. Briefly referring again to FIG. 12 and specifically to the square prediction unit depiction to the upper area (a) of the figure, that order can, for example be for a current PU under reconstruction (1201) such that the motion vector of the PU to the top (1203) can be in the ordered list before the motion vector of the PU to the left (1204). That order can result in the use of an at least statistically longer codeword for the index decoded in the second block (1120). As the geometric properties, when using planar coding, of all PUs in a picture are the same, standardization groups have conducted research and optimized the static ordering of the ordered list according such that statistically likely positions such as, for example top (1203) precede statistically less likely positions such as left (1204) in the order.

Although FIG. 11 shows example blocks of the method (1100), in some implementations, the method (1100) may include additional blocks, fewer blocks, different blocks, or differently arranged blocks than those depicted in FIG. 11. Additionally, or alternatively, two or more of the blocks of the method (1100) may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

Figure 13:
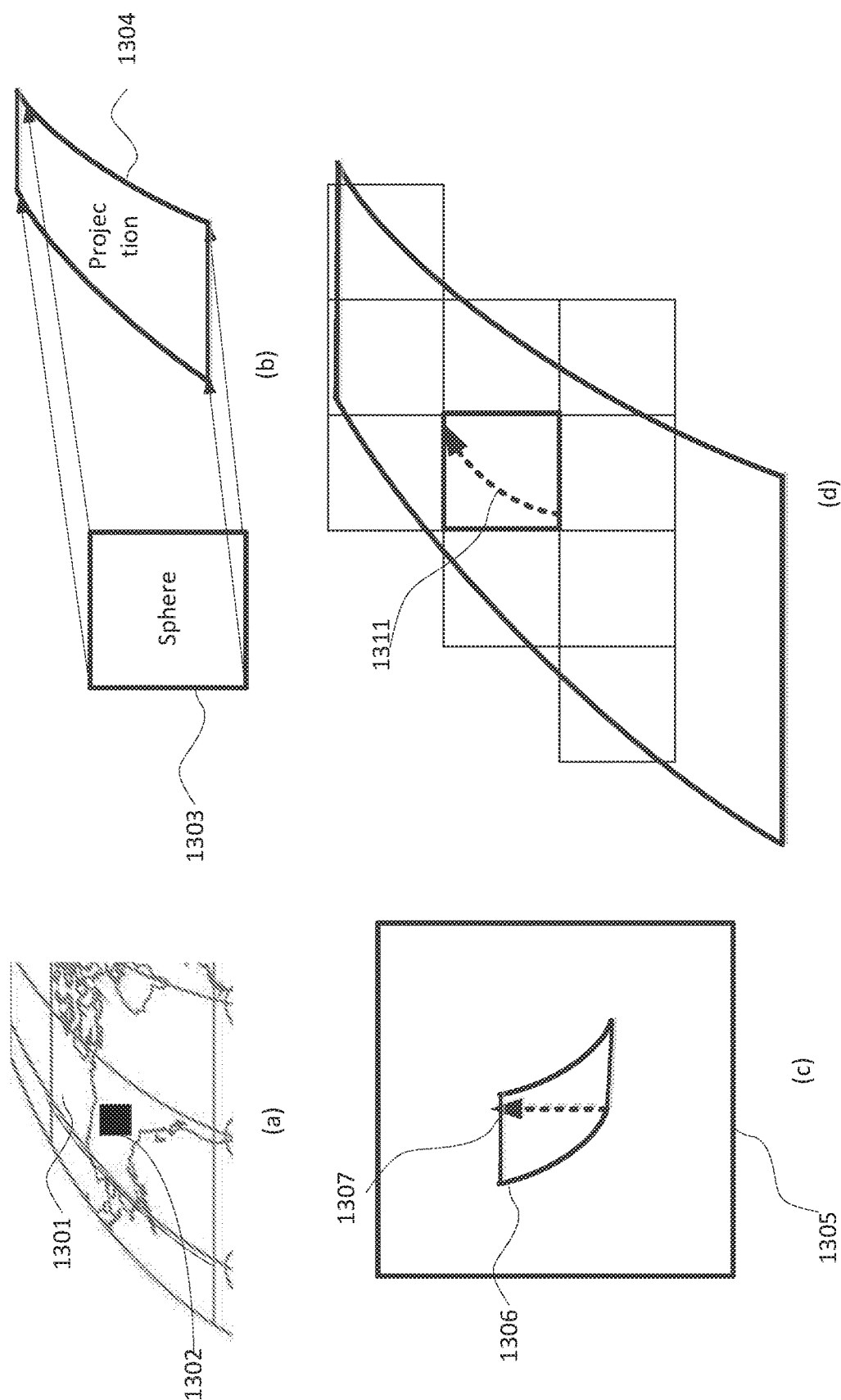
FIG. 13 is a diagram illustrating details of a projection and a reverse projection on a sphere, according to an embodiment.

FIG. 13 is a diagram illustrating details of a projection and a reverse projection on a sphere, according to an embodiment, according to an embodiment. Referring to FIG. 13, shown in portion (a) is a PU (1302) located in northern Alaska (1301) on an equirectangular projected map of the earth as an example of an area of projection where geometric distortion is significant. This PU (1302) can for example cover the same samples as block (905) in FIG. 9. In portion (b), on the projection, the northern part of Alaska as bordered through latitude/longitude lines (1304) covers an approximately square surface area (1303) on the (spheric) surface of earth. Conversely, in portion (c), the square PU (1302) in the projection covers a shape (1306) when inverse-projected on the sphere's surface. A motion vector pointing straight "North" on the earth's surface (1307) of portion (c) would translate to a motion vector pointing up and to the right in the projection (1311) of portion (d).

Referring again to FIG. 12, shown at the top area (a) is an example of motion vector prediction candidate order in planar coding. A square current PU under reconstruction (1201), shown in bold lines, and four square PUs of the same size that precede the current CU in decoding order shown in hairline. Each of the four preceding CUs has a centered numeral, and that numeral can be the order of motion vector candidates for the PU under reconstruction as specified in the video coding technology or standard. The example shown is somewhat simplified in that it depicts square PUs of the same size. In some video coding technologies or standards, PUs can also be non-square and/or of different size. In the context of the disclosed subject matter, this makes no difference. Further the ordering of the ordered candidate list is also an example and could be different from one video coding technology or standard to another. Briefly referring to FIG. 9, in a 360 environment, square PUs after reverse projection on a sphere can occur in certain areas, for example in area (902) (central Africa), where a square surface area on the sphere is projected to a (nearly) square area in the projection. Insofar, the described example applies equally well to planar coding as to 360 coding, but—in case of 360 coding—only to certain areas where the projection does not lead to (significant) geometric distortion.

On a lower left area (b) in FIG. 12, shown is the square surface area on a sphere (1305) located in northern Alaska (as shown in FIG. 13) as well as the surface area that translates into a PU after projection (1306). When considering possible predictors, it is optically clear that the PUs, reverse-projected on the sphere, are not square, and are considerably higher than wide. Accordingly, certain statistical properties may change. Moving to a bottom right area (c) of FIG. 12, shown is a current PU (1205) reverse-projected onto the surface of a sphere, and various prediction PUs, for example (1206) and (1207), surrounding the current PU (1205) and preceding the current CU in decoding order. Due to the aspect ratio of the PUs, it can be considerably more likely that a motion vector predictor would be stemming from prediction unit (1206) than from other PUs, as the common border between PU (1206) and the current PU (1205) is almost twice as long as the common borders with other PUs. Therefore, for this spatial projection, the order of the ordered list can be advantageously adjusted as indicated by boldface numerals in the prediction PUs. In particular, as the likelihood is comparatively high that the motion vector associated with the left PU (1206) relative to the current PU (1205) is used for prediction, it makes sense to assign the lowest available numeral—here 1—and thereby the shortest codeword to this spatial predictor location (1206). In contrast, the PU (1207) on top of the PU under reconstruction (1205) is less likely to be the source of the motion vector and, therefore, gets assigned a higher numeral, leading to a later position in the ordered list and potentially a longer codeword for reference.

To summarize, for a current PU located in central Africa on the equirectangular projection of the map of earth, the most likely motion vector prediction candidate is to the top of the current PU, whereas for a PU located in northern Alaska, it would be the PU on the left.

From the description above, it can be derived that there is a value to arrange the order of the ordered list of motion vector candidates based on the geometric properties of the projection and the location of the PU under reconstruction.

In some cases, a certain candidate motion vector may be unavailable in the sense that, for that given position no motion vector was previously decoded. Such can happen, for example, when the PU potentially containing the candidate motion vector was intra coded (as intra coding does not use motion compensation), or because the candidate PU is outside the current picture segment, slice tile, GOB, or similar syntax structure. In such a case, the unavailable motion vector may be omitted in the candidate list, and its place may be taken by the next-in-line motion vector candidate. This mechanism may be the same as used in planar coding.

The order of the candidate list, while perhaps different from PU to PU based on the PU's geometric position in the projection as well as the nature of the projection, can be static in the sense that for all pictures using the same projection, the order of the candidate list can be the same for each geometric position. Insofar, in certain cases, when it is known that the projection itself has not changed, it may not be necessary to re-create the ordering anew while reconstructing a given PU. Instead, a decoder may choose to create a map of candidate list ordering information once, as soon as the nature of the projection is known. When decoding a PU, the geometric position of the PU, which is known, can be used to identify the appropriate ordering information inside the stored map, which may be advantageous from a computational complexity viewpoint, but requires a certain amount of memory to store the map. The map can be created at each point where a projection may change, for example— assuming the projection information is stored in a parameter set, at the time of activation of that parameter set.

Figure 14:
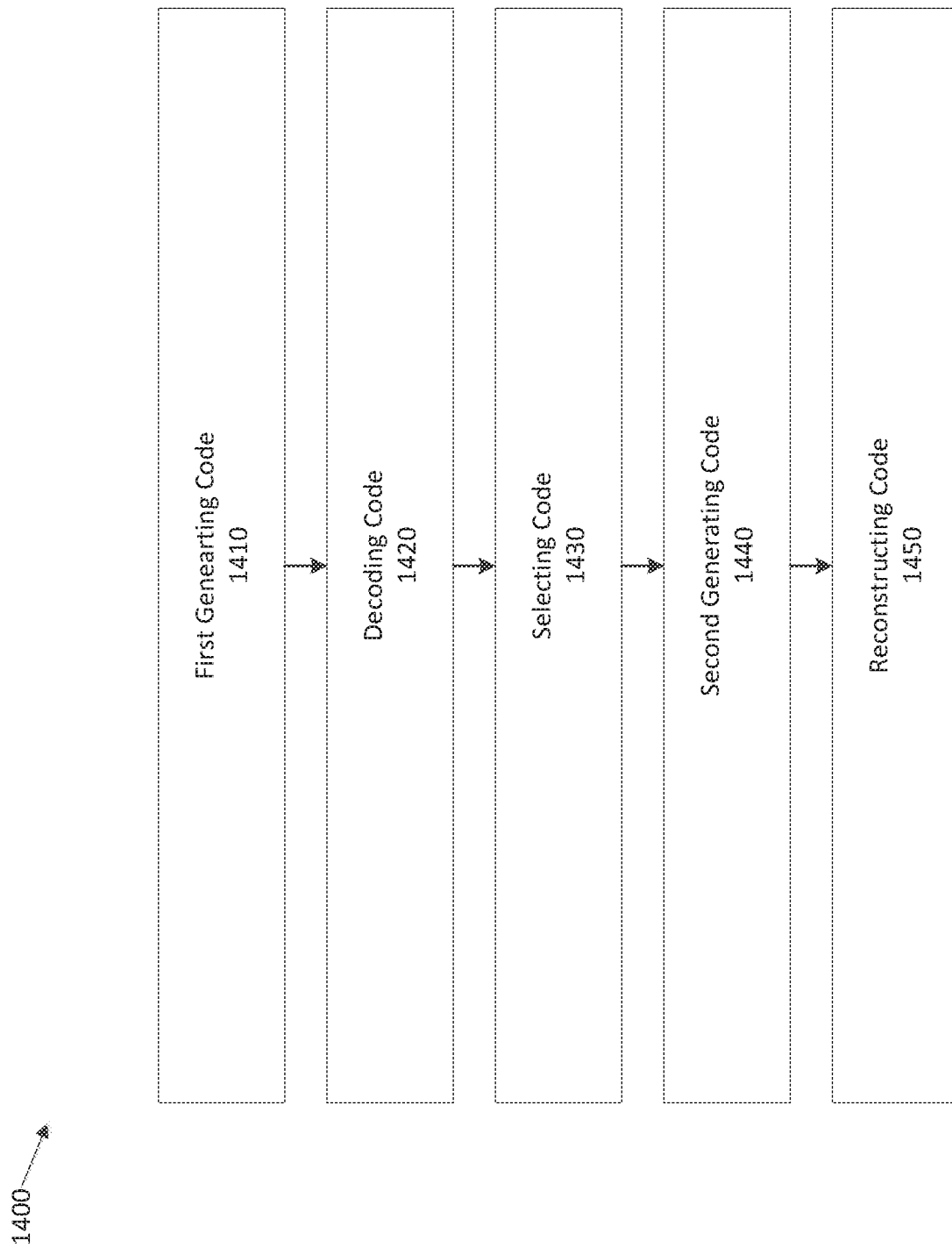
FIG. 14 is a simplified block diagram of an apparatus for motion compensation for 360 video coding, according to an embodiment.

FIG. 14 is a simplified block diagram of an apparatus (1400) for motion compensation for 360 video coding, according to an embodiment.

Referring to FIG. 14, the apparatus (1400) includes first generating code (1410), decoding code (1420), selecting code (1430), second generating code (1440) and reconstructing code (1450).

The first generating code (1410) is configured to cause the at least one processor to generate an ordered candidate list including a plurality of candidate motion vectors for a current prediction unit (PU) under reconstruction, by ordering the plurality of candidate motion vectors in the ordered candidate list based on a geometric property of the projection including the current PU and based on a position of the current PU in the projection.

The decoding code (1420) is configured to cause the at least one processor to decode an index.

The selecting code (1430) is configured to cause the at least one processor to reference the generated ordered candidate list using the decoded index to select one of the plurality of candidate motion vectors from the generated ordered candidate list.

The second generating code (1440) is configured to cause the at least one processor to generate a prediction signal, using the selected one of the plurality of candidate motion vectors.

The reconstructing code (1450) is configured to cause the at least one processor to reconstruct the current PU, using the generated prediction signal.

The first generating code (1410) is further configured to cause the at least one processor to, based on the geometric property of the projection including each of the current PU and a plurality of PUs adjacent to the current PU having a square shape, order a first one of the plurality of motion vectors of a first PU to a top of the current PU, among the plurality of PUs, to be in the ordered candidate list before a second one of the plurality of motion vectors of a second PU to a left of the current PU, among the plurality of PUs.

The first generating code (1410) is further configured to cause the at least one processor to, based on the geometric property of the projection including each of the current PU and a plurality of PUs adjacent to the current PU being reverse-projected on a sphere, order a first one of the plurality of motion vectors of a first PU to a left of the current PU, among the plurality of PUs, to be in the ordered candidate list before a second one of the plurality of motion vectors of a second PU to a top of the current PU, among the plurality of PUs.

The first generating code (1410) is further configured to cause the at least one processor to order a first one of the plurality of motion vectors of a first one of a plurality of PUs adjacent to the current PU, in the ordered candidate list before a second one of the plurality of motion vectors of a second one of the plurality of PUs, based on a first common border between the first one of the plurality of PUs and the current PU being larger than a second common border between the second one of the plurality of PUs and the current PU.

The decoding code (1420) is further configured to cause the at least one processor to decode the index comprises decoding the index from an entropy-coded number.

The decoding code (1402) is further configured to cause the at least one processor to decode the index comprises decoding the index from a symbol that is reconstructed from an entropy-coded video sequence.

The apparatus (1400) further includes transmitting code configured to cause the at least one processor to transmit the reconstructed current PU for post-processing.

The techniques for 360 image and video coding, described above, can be implemented as computer software using computer-readable instructions and physically stored in one or more computer-readable media.

Figure 15:
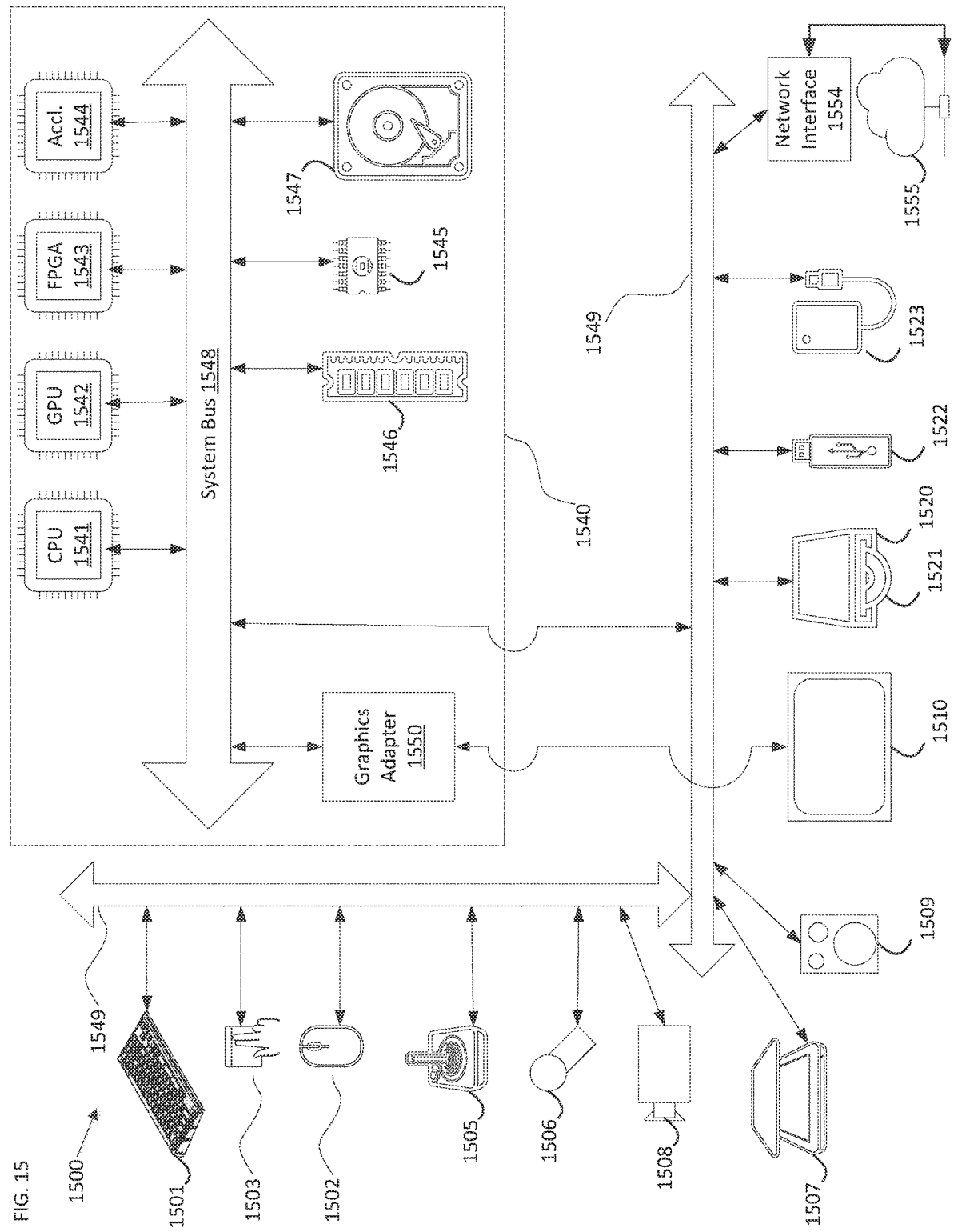
FIG. 15 is a schematic illustration of a computer system in accordance with an embodiment.

FIG. 15 is a schematic illustration of a computer system (1500) in accordance with an embodiment. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system (1500) are examples in nature and are not intended to suggest any limitation as to the scope of use or functionality of the computer software implementing embodiments of the disclosure. Neither should the configuration of components be interpreted as having any dependency or requirement relating to any one or combination of components illustrated in the embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (1504), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (1504), or joystick (1505), but there can also be tactile feedback devices that do not serve as input devices), audio output devices (such as: speakers (1509), headphones), visual output devices (such as screens (1510) to include CRT screens, LCD screens, plasma screens, OLED screens, each with or without touch-screen input capability, each with or without tactile feedback capability-some of which may be capable to output two dimensional visual output or more than three dimensional output through devices such as stereographic output; virtual-reality glasses, holographic displays and smoke tanks), and printers.

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc, specialized ROM/ASIC/PLD based devices such as security dongles, and the like.

Those skilled in the art may also understand that term "computer readable media" as used in connection with the presently disclosed subject matter does not encompass transmission media, carrier waves, or other transitory signals.

Computer system (1500) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosure encompasses any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of decoding a coded video sequence in a decoder, into a series of reconstructed pictures, the reconstructed pictures representing a projection on a planar surface of a non-planar surface, the decoder employing motion compensation with motion vector prediction, and the method comprising:
generating an ordered candidate list including a plurality of candidate motion vectors for a current prediction unit (PU) under reconstruction, by, based on a geometric property of the projection including each of the current PU and a plurality of PUs adjacent to the current PU being reverse-projected on a sphere, ordering a first one of the plurality of candidate motion vectors of a first PU to a left of the current PU, among the plurality of PUs, to be in the ordered candidate list before a second one of the plurality of candidate motion vectors of a second PU to a top of the current PU, among the plurality of PU;
decoding an index;
referencing the generated ordered candidate list using the decoded index to select one of the plurality of candidate motion vectors from the generated ordered candidate list;
generating a prediction signal, using the selected one of the plurality of candidate motion vectors; and
reconstructing the current PU, using the generated prediction signal.

2. The method of claim 1, wherein the generating the ordered candidate list comprises ordering a third one of the plurality of candidate motion vectors of a first one of the plurality of PUs adjacent to the current PU, in the ordered candidate list before a fourth one of the plurality of candidate motion vectors of a second one of the plurality of PUs, based on a first common border between the first one of the plurality of PUs and the current PU being larger than a second common border between the second one of the plurality of PUs and the current PU.

3. The method of claim 1, wherein the decoding the index comprises decoding the index from an entropy-coded number.

4. The method of claim 1, wherein the decoding the index comprises decoding the index from a symbol that is reconstructed from an entropy-coded video sequence.

5. The method of claim 1, further comprising transmitting the reconstructed current PU for post-processing.

6. An apparatus for decoding a coded video sequence, into a series of reconstructed pictures, the reconstructed pictures representing a projection on a planar surface of a non-planar surface, the apparatus employing motion compensation with motion vector prediction, and the apparatus comprising:
at least one memory configured to store computer program code; and
at least one processor configured to access the at least one memory and operate according to the computer program code, the computer program code comprising:
first generating code configured to cause the at least one processor to generate an ordered candidate list including a plurality of candidate motion vectors for a current prediction unit (PU) under reconstruction, by, based on a geometric property of the projection including each of the current PU and a plurality of PUs adjacent to the current PU being reverse-projected on a sphere, ordering a first one of the plurality of candidate motion vectors of a first PU to a left of the current PU, among the plurality of PUs, to be in the ordered candidate list before a second one of the plurality of candidate motion vectors of a second PU to a top of the current PU, among the plurality of PU;
decoding code configured to cause the at least one processor to decode an index;
selecting code configured to cause the at least one processor to reference the generated ordered candidate list using the decoded index to select one of the plurality of candidate motion vectors from the generated ordered candidate list;
second generating code configured to cause the at least one processor to generate a prediction signal, using the selected one of the plurality of candidate motion vectors; and
reconstructing code configured to cause the at least one processor to reconstruct the current PU, using the generated prediction signal.

7. The apparatus of claim 6, wherein the first generating code is further configured to cause the at least one processor to order a third one of the plurality of candidate motion vectors of a first one of the plurality of PUs adjacent to the current PU, in the ordered candidate list before a fourth one of the plurality of candidate motion vectors of a second one of the plurality of PUs, based on a first common border between the first one of the plurality of PUs and the current PU being larger than a second common border between the second one of the plurality of PUs and the current PU.

8. The apparatus of claim 6, wherein the decoding code is further configured to cause the at least one processor to decode the index comprises decoding the index from an entropy-coded number.

9. The apparatus of claim 6, wherein the decoding code is further configured to cause the at least one processor to decode the index comprises decoding the index from a symbol that is reconstructed from an entropy-coded video sequence.

10. The apparatus of claim 6, further comprising transmitting code configured to cause the at least one processor to transmit the reconstructed current PU for post-processing.

11. A non-transitory computer-readable storage medium storing instructions that cause at least one processor to decode a coded video sequence, into a series of reconstructed pictures, the reconstructed pictures representing a projection on a planar surface of a non-planar surface, the at least one processor employing motion compensation with motion vector prediction, and the instructions further cause the at least one processor to:
generate an ordered candidate list including a plurality of candidate motion vectors for a current prediction unit (PU) under reconstruction, by, based on a geometric property of the projection including each of the current PU and a plurality of PUs adjacent to the current PU being reverse-projected on a sphere, ordering a first one of the plurality of candidate motion vectors of a first PU to a left of the current PU, among the plurality of PUs, to be in the ordered candidate list before a second one of the plurality of candidate motion vectors of a second PU to a top of the current PU, among the plurality of PU;

decode an index;

reference the generated ordered candidate list using the decoded index to select one of the plurality of candidate motion vectors from the generated ordered candidate list;

generate a prediction signal, using the selected one of the plurality of candidate motion vectors; and reconstruct the current PU, using the generated prediction signal.

12. The non-transitory computer-readable storage medium of claim 11, the instructions further cause the at least one processor to order a third one of the plurality of candidate motion vectors of a first one of the plurality of PUs adjacent to the current PU, in the ordered candidate list before a fourth one of the plurality of candidate motion vectors of a second one of the plurality of PUs, based on a first common border between the first one of the plurality of PUs and the current PU being larger than a second common border between the second one of the plurality of PUs and the current PU.

13. The non-transitory computer-readable storage medium of claim 11, the instructions further cause the at least one processor to decode the index comprises decoding the index from an entropy-coded number.

14. The non-transitory computer-readable storage medium of claim 11, the instructions further cause the at least one processor to decode the index comprises decoding the index from a symbol that is reconstructed from an entropy-coded video sequence.

* * * * *